United States Patent [19]

Carroll et al.

[11] Patent Number: 5,785,940
[45] Date of Patent: Jul. 28, 1998

[54] SILICATE REACTOR WITH SUBMERGED BURNERS

[75] Inventors: J. Randol Carroll, West Chester; William E. Breitenbach, Collegeville; William C. Combs, Exton, all of Pa.

[73] Assignee: PQ Corporation, Valley Forge, Pa.

[21] Appl. No.: 617,456

[22] Filed: Mar. 18, 1996

[51] Int. Cl.$^6$ .................................................. C01B 33/32
[52] U.S. Cl. ........................................... 423/334; 422/164
[58] Field of Search ................................... 423/332, 334; 422/164, 167

[56] References Cited

U.S. PATENT DOCUMENTS

| | | | |
|---|---|---|---|
| 2,211,733 | 8/1940 | Soderberg | 23/110 |
| 2,243,027 | 5/1941 | Baker | 423/334 |
| 3,241,548 | 3/1966 | See et al. | 126/360 |
| 3,248,205 | 4/1966 | Dorf et al. | 65/335 |
| 3,260,587 | 7/1966 | Dorf et al. | 65/135 |
| 3,606,825 | 9/1971 | Johnson | 65/136 |
| 3,627,504 | 12/1971 | Johnson et al. | 65/136 |
| 4,045,197 | 8/1977 | Tsai et al. | 65/27 |
| 4,047,669 | 9/1977 | Gutai | 239/540 |
| 4,203,761 | 5/1980 | Rose | 75/40 |
| 4,285,718 | 8/1981 | Mathias et al. | 65/134 |
| 4,336,235 | 6/1982 | Deabriges | 423/332 |
| 4,481,024 | 11/1984 | Bly | 65/337 |
| 4,539,034 | 9/1985 | Hanneken | 65/134 |
| 4,545,800 | 10/1985 | Won et al. | 65/134 |
| 5,282,881 | 2/1994 | Baldock et al. | 75/500 |
| 5,308,043 | 5/1994 | Floyd et al. | 266/78 |
| 5,344,633 | 9/1994 | Sorensson | 423/333 |

OTHER PUBLICATIONS

J. R. Carroll, J. C. Maginn, G. Y. Anders, paper entitled "The Submerged–Combustion Technique for High–Temperature Melting," presented at the Eleventh National Heat Transfer Conference, A.I.Ch.E.–A.S.M.E., Minneapolis, Minnesota, Aug. 3–6, 1969.

Laurel M. Sheppard, "Progress Continues in Glass Melting Technologies," *Ceramic Industry*, Jan. 1996, pp. 26–30.

Brochure entitled "The Ausmelt Top Submerged–Lance Process," copyright 1995, Ausmelt Technology Corporation. (no month).

*Primary Examiner*—Steven Bos
*Assistant Examiner*—Stuart L. Hendrickson
*Attorney, Agent, or Firm*—Ratner & Prestia

[57] ABSTRACT

The present invention pertains to a reactor for producing sodium or potassium silicate. The reaction vessel includes submerged burners. A trough extends downwards and away from the reaction vessel. The trough connects to an outlet in the reaction vessel where molten silicate produce is removed, molded, and allowed to cool. The reactor also includes first and second heat exchangers, both located in the exit path of the exhaust gases from the reactor. The exhaust gases pass through a first heat exchanger and exchange heat with incoming combustion gas. This preheated combustion gas is then used as the oxidizer to burn fuel gas through the burners. The hot exhaust gases are then passed through a second heat exchanger. The second heat exchanger exchanges heat between the hot flue exhaust gases and feed sand. The hot exhaust gases can also be passed through a third heat exchanger to make hot water. The hot water is used to dissolve the silicate product. The burners are designed to deliver four to forty million BTU/hour to the reaction vessel, resulting in a production rate in excess of 100 pounds/hour/square foot of reaction vessel surface area utilizing 1500–1800 BTU/pound of sodium silicate produced.

7 Claims, 3 Drawing Sheets

SILICATE REACTOR WITH SUBMERGED BURNERS

BACKGROUND OF THE INVENTION

1. Field of the Invention

The present invention relates to silicate reactors where burners which provide heat to melt and allow feed material to react and form sodium silicate, potassium silicate, or a mixture thereof, are located within the bed of molten silicate and raw materials in a reaction vessel.

2. Description of the Related Art

Sodium silicate is generally produced by mixing silica (in the form of sand) and sodium carbonate (from soda ash) at high temperatures, allowing the materials to melt and react. Most often, this melting is performed in a high temperature furnace hearth. The raw materials, generally sand as the silica source and soda ash as the sodium carbonate source, are fed into a hearth. Potassium carbonate is used as the raw material when making potassium silicate. The furnace hearth includes burners to heat the raw materials. These burners are traditionally positioned above the level of material in the hearth. The burners introduce fuel into the hearth. The fuel mixes with air over the molten "melt" of silicate and burns, producing heat and introducing hot gases into the space above the material in the hearth. The raw material and the silicate are thus heated by conduction and radiation.

The raw materials are premixed and introduced into the reaction vessel on top of the "melt" of molten silicate. Thus the "melt" includes not only reacted silicate, but also unreacted raw material. Finished molten silicate is most often drawn off from the opposite end of the furnace hearth from where the raw materials are introduced. The melt generally moves through the furnace hearth without mechanical mixing.

Air for combustion of the fuel is preheated by means of "checker packs". A checker pack is a large pack of bricks (or checkers) arranged in a three-dimensional checkerboard pattern. A furnace will generally be equipped with two checker packs. Combustion air is drawn in through one of the checker packs. Hot products of combustion are exhausted through the other checker pack to a flue. As the hot exhaust gases pass over the checker pack, the gases heat the checkers. Once the checkers are hot, the flow of gases is reversed. Fresh air is drawn in through the hot checker pack, and hot gases are exhausted through the cooler pack. In this manner, the combustion air is preheated.

A typical prior art silicate furnace is shown in FIG. 1. FIG. 1 shows furnace 10 having furnace hearth 12. Hearth 12 has refractory 14 covering the bottom thereof. The normal level of silicate in furnace hearth 12 is shown by line 16. Furnace hearth 12 is equipped with ports 18, which lead from hearth 12 into regenerators 20. Regenerators 20 include checker packs 22. Flues 24 connect regenerators 20 to the exhaust stack or inlet. A design of this type uses the checker packs in regenerators 20 to heat the feed air and increase the efficiency of the furnace. This works well in conventional furnaces.

However, conventional furnaces have several drawbacks. They are expensive to build and maintain. Their size makes construction expensive. A great deal of refractory material must be used in building a conventional furnace. When the refractory material deteriorates, the replacement of the material is expensive and time consuming. The amount of material used in making the furnace leads to a long start-up and cool-down time. The start-up time for a conventional furnace can be as long as a week or more. The refractory material must be heated slowly to allow for gradual and even expansion. Thus such furnaces must be operated continuously for years (twenty-four hours each day, seven days a week). Personnel staffing costs are therefore high. The furnace, if shut down for maintenance, will be out of commission for two to four weeks. Again, due to their size, they cannot be moved once built. Finally, due to the poor heat transfer between the burning fuel above the bed of raw materials and silicate and the silicate itself, the energy cost per pound of silicate produced is high, and the production rate, in pounds of silicate per square foot produced per hour, is low. Energy required to make sodium silicate in a conventional furnace is between 2200 and 2500 BTU/pound of solid product.

Recently, burners have been introduced into other high temperature operations, which exhaust hot gases below the level of material in a furnace or melted. Such burners are generally referred to as submerged burners because they are submerged in the molten material and, or, placed below the material to be melted. These burners can be arranged on the bottom of a furnace or melter (submerged bottom burners), protruding through the floor of the melter. The burners can also be top-entering, sticking down into the molten material, or side-entering. Of course, all submerged burners must provide for the introduction and mixing of combustion air or oxygen with the fuel in the burner so as to permit burning under the pool of molten material.

Submerged burners provide good heat transfer to the bed of materials. Such burners are especially effective for low viscosity materials. The burners provide turbulence and consequent thorough mixing of the molten materials. Submerged burners have been used with good, commercially viable results for melting materials such as slag, mineral wool, and metallurgical ores.

Nevertheless, submerged bottom burners do have several drawbacks. First, care must be taken to prevent molten material from creeping backwards into the submerged bottom burners and extinguishing them. Second, if the submerged bottom burners are extinguished (due to a power failure or some other unforeseen event) the molten material will flood the burners and ruin them, occasioning costly and time-consuming replacement. For this reason, a submerged bottom burner system usually includes compressed gas or a pump to pump air or other gas through the system should there be a power loss. The pumping of this gas continues until the molten material cools and hardens. At that point, there is no danger of the material flooding the burners. Such a plumbing system can be quite complex for just a few burners. As more burners are added to the system for commercial applications, the plumbing problems quickly become unmanageable.

Top-entering submerged burners reduce the chance that molten material will creep into the burner and extinguish it since the material would have to creep upwards. While this is possible if the exhaust gas flow rate through the burner is low, such problems rarely occur when melting material of low viscosity.

Further, top entering submerged burners can also eliminate the need for a compressed gas backup system to keep the burners clear in the case of a power failure. Rather the burners can be spring loaded, biased in an upwards, withdrawn position. The top-entering burner (also referred to as a lance) is held down into the melter with force. If a power failure occurs, the spring biasing mechanism will retract the lance out of the melter. Such lances are described in U.S.

Pat. No. 5,282,881 to Baldock et al. and U.S. Pat. No. 5,308,043 to Floyd et al..

Although submerged burners have been used to successfully increase efficiency in the operations set forth above, these burners have not heretofore been used successfully in silicate production. Submerged burners are incompatible with regenerator-type heat recovery systems, such as those used in silicate furnaces, since submerged burners, even top lance type submerged burners, require a constant flow of air to prevent plugging. Therefore all combustion air is fed at ambient temperature to submerged burners and some heat from combustion is thus lost to the feed air. Thus efficiency has been a problem with submerged burners in silicate systems.

Silicate is a very high viscosity material. Even when molten, the viscosity remains high. Therefore, the tendency of the material to creep into submerged burners is much higher in silicate applications than when working with lower viscosity materials. Extreme care must be taken to prevent the silicate from creeping backwards into the submerged burners and extinguishing them, whether the burners are located in the floor, side, or top of the bed. This problem has discouraged the use of submerged burners in silicate systems.

Another problem with using submerged burners in a silicate system is that the exhaust from the submerged burners is released up through the silicate. This introduces large volumes of gas into the silicate. This gas forms bubbles in the silicate, making the silicate into a foam. While this foam settles to some degree before it solidifies, the resulting cooled silicate mass generally has a very low density, around 100 pounds per cubic foot, which is too low to be commercially acceptable.

Further, since the high heat transfer from submerged burners to the molten material (whether or not silicate) is very high, the residence time of the material in a furnace or melter can be very short. In melters this is not a problem since no chemical reaction takes place, the material simply melts. However, in silicate production, a chemical reaction takes place and with low residence times unreacted silica particles can remain in the finished silicate. These particles are a problem when the silicate is used. Many major processes for using silicate involve first dissolving the silicate in water. Where unreacted silica remains in the finished silicate, these insoluble silica particles can clog the dissolving equipment. Even where silicate is not dissolved, it is eventually reacted, and these silica particles would likely be a problem in such an operation as well.

For all of the foregoing reasons, submerged burners have not heretofore been used successfully with silicate systems.

SUMMARY OF THE INVENTION

The present invention provides a relatively small and inexpensive, high efficiency silicate reactor having submerged burners and a high production rate. The reactor includes a trough extending downwards and away from the reaction vessel. The trough connects to an outlet where molten silicate is removed, molded, and allowed to cool. The reactor also includes a heat exchanger located in the exit path of the exhaust gases from the reaction vessel. The exhaust gases pass through a first heat exchanger and exchange heat with incoming combustion air. This preheated combustion air is then used as the oxidizer to burn fuel gas through the burners. The hot exhaust gases are then passed through a second heat exchanger. The second heat exchanger exchanges heat between the hot flue exhaust gases and feed silica and/or soda ash. The hot exhaust gases can also be passed through a third heat exchanger to make hot water. The hot water is then used to dissolve the resulting silicate. Due to the size, the use of submerged burners, and appropriate recycling of heat, the reactor can produce silicate using as little as 1500–1600 BTU/pound of silicate produced.

DETAILED DESCRIPTION OF THE INVENTION

Figure 1:
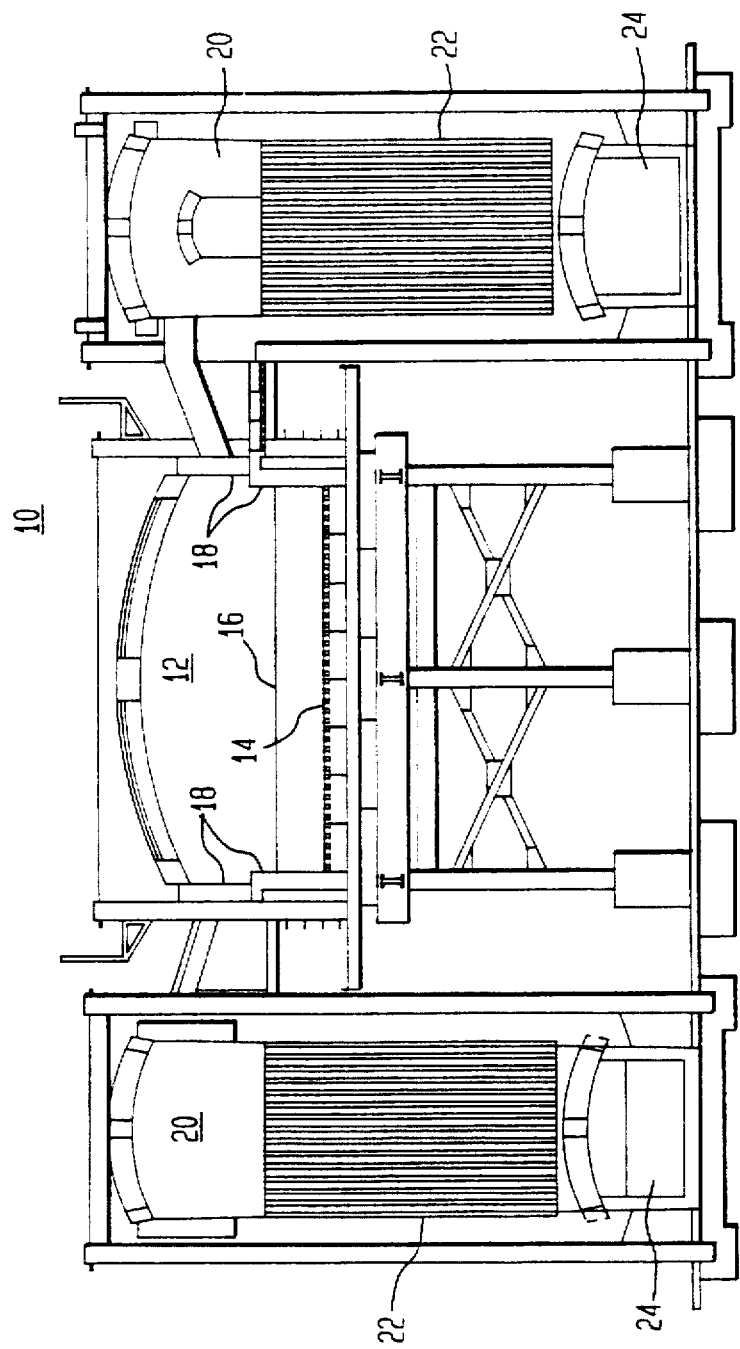
FIG. 1 is a side elevational view of a prior art silicate furnace.
Figure 2:
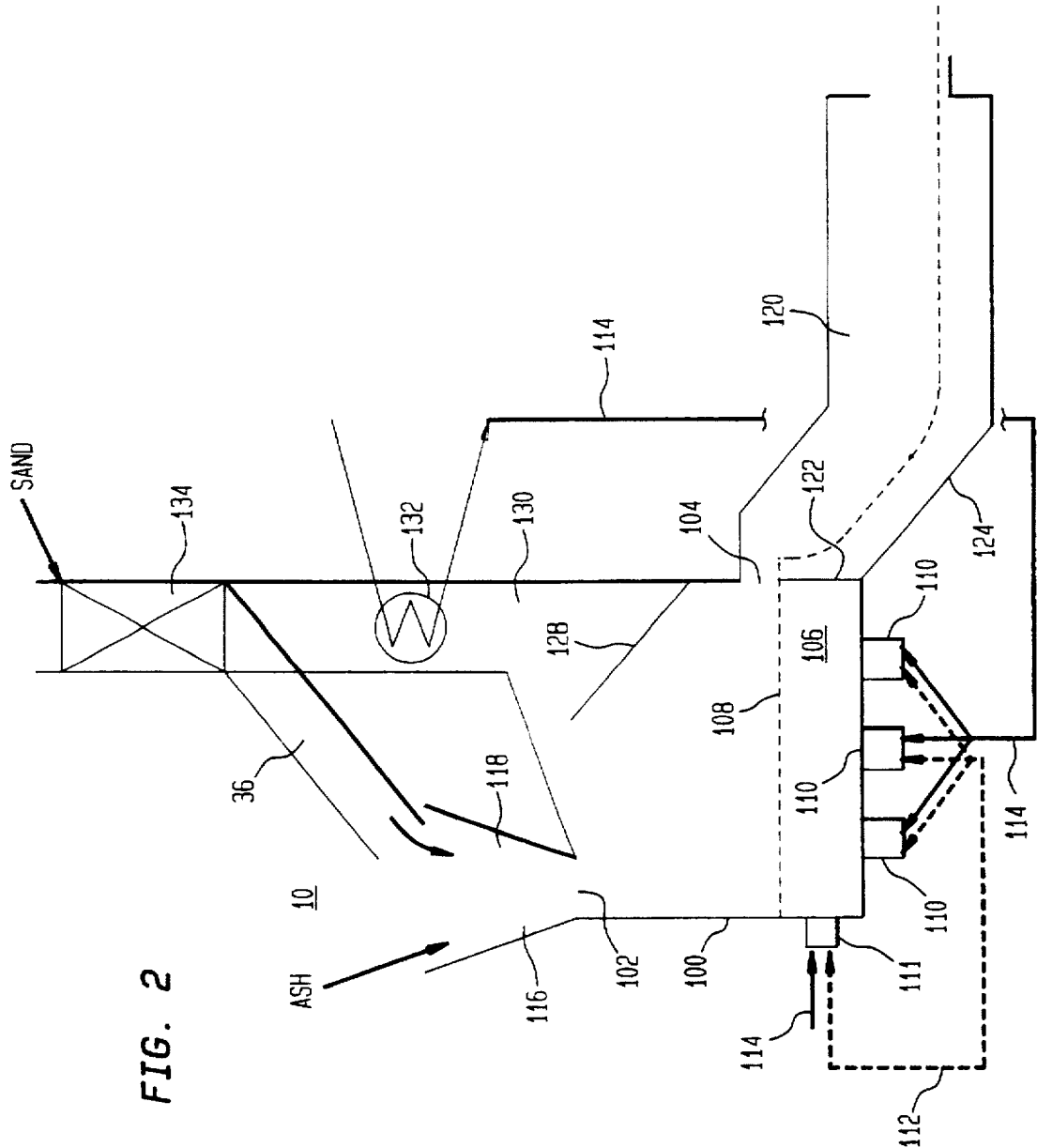
FIG. 2 is a cross-sectional view of a silicate reactor in accordance with the present invention.

A silicate reactor system according to the present invention is shown generally in FIG. 2. FIG. 2 shows a silicate reactor 10 having a reactor inlet 102 and an outlet 104. Reactor 10 also includes a reaction vessel 100 which is equipped with one or more submerged bottom burners 110. Submerged bottom burners 110 are positioned in the floor of reaction vessel 100. Submerged bottom burners 110 may be standard burners, provided they are designed specifically for use as submerged bottom burners in glass furnaces or silicate reactors. One example of a bottom burner designed for use in a glass furnace can be seen from U.S. Pat. No. 3,260,587 to Dolf, et al., which is incorporated herein by reference. This bottom burner is specifically designed to prevent glass from creeping back into the burner and extinguishing it. Unfortunately, these burners were never commercially acceptable due to the difficulties discussed previously.

As shown in FIG. 2, reactor 10 includes three bottom burners 110. In actual practice, reactor 10 could include anywhere from one to forty bottom burners depending on the precise size and configuration of the reaction vessel. As more burners are added, two problems arise. First, the bottom burners must penetrate the floor of reaction vessel 100 and each one tends to weaken the structure. For that reason, large silicate reactors with submerged bottom burners have never been pursued. The collapse of a prior art silicate furnace due to too many submerged bottom burners would be disastrous. Second, each bottom burner must have a supply of compressed gas which will be expelled through the burner should there be a failure in the heat source to the reactor. This gas is intended to ensure the bottom burner is free of silicate until the silicate cools and ceases to flow. Otherwise the silicate would flow back into the bottom burner and solidify, permanently damaging the burner. If too many burners are used, the plumbing problems associated with supplying each bottom burner with three different gas lines (fuel, air, and emergency gas) becomes so complex as to be unmanageable. For these reasons, it is preferable to keep the number of bottom burners low, most preferably below 25. With the small size reactors of the present invention, this is quite reasonable.

It should be noted that the risk of collapse of the floor of a reactor or furnace can be reduced somewhat by substituting side-entering submerged burners for some or all of the submerged bottom burners. Such burners are shown as side burners 111. The use of such burners alone will somewhat limit the size of the reactor since the burning fuel must extend near the center of reaction vessel 100 to ensure heating and mixing of all material in the reactor. With the small reactors of the present invention, this does not become a problem.

Bottom burners 110 are fed gas and air through lines 112 and 114 respectively. The burners mix the gas and air internally, where the mixture is then ignited. Line 114 may alternatively transport oxygen or an oxygen enriched (or nitrogen depleted) mixture. Bottom burners 110 may be adjusted to burn fuel gas with an oxygen enriched mixture. Such mixtures are commonly known as oxyfuel and aid in reducing $NO_x$ emissions since less nitrogen is introduced into the burner. Such mixtures can also burn hotter by reducing the volume of gas which must be heated by the combustion.

Reaction vessel 100 contains a bed of sand and soda ash 106. The level of the bed 106 of sand and soda ash in reaction vessel 100 is shown by dotted line 108. As previously stated, exhaust gases from bottom burners 110 bubble up through bed 106 in reaction vessel 100. Accordingly, although the level of silicate in the reaction vessel is shown by dotted line 108 which appears flat, in actuality the inside of the reaction vessel is a turbulent mass. This turbulence is disadvantageous to the process in that the resulting silicate includes trapped gas. The turbulence is also advantageous to the process. By allowing greater interaction between the hot combustion gases and the silicate, heat transfer between the exhaust gases and the silicate is high. This is very unlike the prior art where hot gases rested on top of the silicate bath, and heat transfer was commensurately quite low. Further the turbulence promotes thorough mixing of the silicate. The high heat transfer achieved by the present process also allows less waste heat to be generated. As a result, less heat per pound of silicate produced is needed in the present process. Using the recycling of heat as described herein, acceptable quality, commercially salable silicate can be made using heat at a rate of not more than 1,800 BTU per pound silicate. Preferably, the process will use not more than 1,500 BTU per pound silicate.

The amount of heat consumed per pound of silicate produced can vary with the design of the reactor. When the reactor is designed and built, one consideration is the cost of the reactor. If extensive heat recycling systems are built into the reactor, the initial cost will be high, but the cost to operate will be lower due to higher efficiency. By contrast, if the initial cost is kept low by eliminating most of the heat recycling systems described herein, the operating cost will be higher, and the heat consumption will be around 1,800 BTU/pound silicate produced or even higher. Even if the heat consumption is as high as conventional furnaces (2200–2500 BTU/pound), the reactor of the present invention offers advantages. Since the reactor is small, it can be made to be mobile. The refractory materials can be removed from the reactor and the entire unit shipped across the country or around the world. The reactor would fit into a truck or onto a rail car. The initial cost for such a reactor would be small, as would be the rebuild cost.

Finally, most of the burning of the fuel/gas mixture ejected from the submerged burners takes place in tiny bubbles trapped in the silicate. Thus, the combustion takes place at a lower temperature than would otherwise be the case since the small bubbles provide good heat transfer to the silicate, which reduces the temperature of combustion inside the bubbles. By lowering the temperature of combustion, the production of $NO_x$ is reduced, which is another advantage of the present process.

Figure 3:
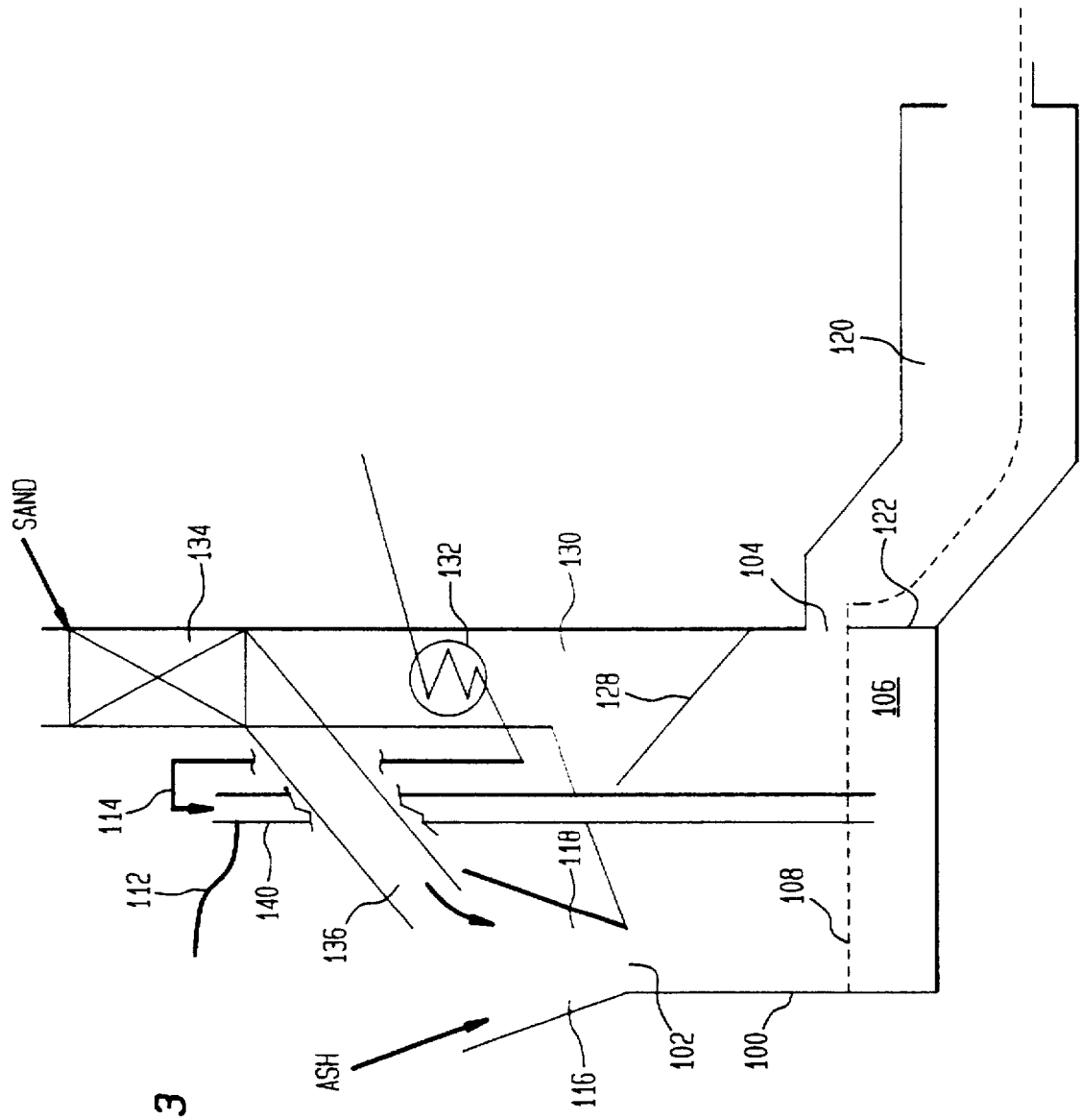
FIG. 3 is a cross-sectional view of an alternative embodiment of a silicate reactor in accordance with the present invention.

An alternative configuration of reactor 10 is shown in FIG. 3. In this configuration, submerged bottom burners 110 have been replaced by top-submerged lance 140. Although only one lance is shown, it would be possible to use three or even more lances if greater production were desired and reaction vessel 100 were made larger. The lances do not weaken the floor of reaction vessel 100, and therefore, there can be as many lances as necessary incorporated into reactor 10. As previously stated, lance 140 overcomes many drawbacks of submerged bottom burners 110. The lance requires no extra lines to allow for continuous gas flow in the event of a power failure. However, a mechanism to withdraw the lance automatically, should power fail, is needed and conventional, but is not shown in the figure. Lances appropriate for use with the present invention are described in U.S. Pat. Nos. 5,282,881 to Baldock, et al. and 5,308,043 to Floyd et al., the specifications of which are incorporated herein by reference. Regardless of what type of submerged burner is used, the operation of the reactor is the same. That operation is described below with reference to submerged bottom burners, but applies equally to reactors utilizing top submerged lance burners.

Silica and soda ash (collectively the "batch") are introduced through reactor inlet 102. As shown in FIG. 2, the soda ash is introduced from feeder 116, and silica is introduced from feeder 118. The batch materials are introduced on top of bed 106 or into the bed directly. In a conventional furnace, the residence time of the silicate must be extended in order to allow proper melting, reaction, and uniform incorporation of the batch into the silicate melt. In the present invention, the residence time of the silicate can be quite short due, in part, to the turbulence created by submerged burners 110. This turbulence ensures proper mixing and allows quick incorporation and reaction of the batch materials into the silicate melt. If even greater production rate is desired, the silica (sand) feed may be milled to silicate flour to increase the surface area and promote faster reaction.

Because of the high heat which can be added to the melt by the submerged burners, the batch can be reacted and incorporated very quickly. Thus, the production rate (in pounds/hour/square foot of reaction vessel surface area) is very high, much higher than that of a conventional reactor. Using air as the combustion gas for burners 110, the reactor of the present invention can achieve production rates in excess of 100, and preferably 200, pounds per hour per square foot, whereas conventional reactors typically achieve rates of only 15–25 pounds per hour per square foot. Using oxyfuel for burners 110, instead of a standard fuel gas/air mixture, the production rate of the reactor of the present invention can be as high as 200, preferably 400, pounds per hour per square foot. Thus a reactor with a reaction vessel having an area of 100 square feet could be used to produce in excess of 10 tons of solid silicate per hour. It is contemplated that reactors made in accordance with the present invention will have reactor vessels between 5 and 100 square feet in area, preferably between 10 and 60 square feet.

While the turbulent conditions in reaction vessel 100 are advantageous for thorough mixing and incorporation of feed material into the silicate batch, they are disadvantageous in that they introduce large numbers of bubbles and voids into the silicate. These bubbles and voids are generally undesirable as clear solid silicate is generally preferred as a product. While the resulting silicate need not be perfectly clear, it should have a density high enough to be sold commercially. The present invention overcomes these difficulties using a specially developed forehearth 120. Reaction vessel 100 includes weir 122 which maintains the level 108 of bed 106 of sand, soda ash, and molted silicate in reaction vessel 100 at the proper height. As the level of the reacted material rises, silicate flows over weir 122 and into forehearth 120. Forehearth 120 includes a sloped section 124 adjacent reaction vessel 100. Sloped section 124 slopes downward and away from weir 122. This causes the silicate to flow over weir 122 and vertically down the reverse side of the weir. The silicate then flows down sloped section 124. As the silicate flows down sloped section 124, the flow of silicate is thinned, and the shear forces on the silicate increase. The result is a thinner layer of silicate in the sloped section 124 of forehearth 120, as shown by dotted line 108.

Thinning the silicate material allows large voids and bubbles to migrate to the surface and be expelled quickly. Further, the shearing action of the downward flow of the silicate mechanically aids in mixing and allowing any unreacted silica to react and become incorporated into the silicate. In this way, the silicate exiting forehearth 120 has few voids, with a density of at least 125 lb./ft$^3$, preferably at least 135 lb./ft$^3$, while including little or no unfused silica. Thus the slope of section 124 of forehearth 120 must be of a length and downward angle sufficient to provide a commercially acceptable end product. This will depend somewhat on the composition of the silicate, but preferably the angle should be at least 45°, while the length of forehearth 120 should preferably be at least 10 ft. The angle and length are somewhat dependent on one another. A shorter length could be used with a lower angle, because the residence time would be comparable. Nevertheless, some angle is needed to provide the thinning and shear necessary to produce commercially acceptable silicate. It is contemplated that an angle of at least 30° would be needed to make a furnace which would operate efficiently.

Further, to keep the silicate in forehearth 120 molten and free flowing, the forehearth should be heated, whether by conventional electrical heating or non-submerged burners. The more heating provided, the less angle and length is needed in the forehearth.

While this solves the problems of voids and unfused silica, there remains the problem of high heat loss due to the escape of hot gases from submerged burners through the flue. As previously explained, recovery via traditional regenerators with checker packs is not feasible, especially where oxyfuel is to be used. However, some of this heat can be recycled in order to increase the efficiency of the system to a point where it becomes economical to operate.

First, the hot gases from reaction vessel 100 are directed upwards into flue 130. Baffle 128 may be installed in reaction vessel 100 to prevent silicate from being carried into flue 130 by the hot exhaust gases. A first heat exchanger 132 is incorporated into flue 130. First heat exchanger 132 may be any appropriate type including shell and tube, double tube, or other conventional heat exchanger. First heat exchanger is used to exchange heat from the flue gas to combustion air or oxygen-enriched air. Accordingly, a heat exchanger specifically designed for gas to gas heat exchange should be used. The hot combustion air is then transported to burners 110 through line 114. This recycling helps reduce the amount of heat which must be added to the system, reducing fuel costs and increasing overall efficiency.

Although first heat exchanger 132 transfers some heat from the exhaust gases to combustion air, exhaust gases leaving first heat exchanger 132 are still very hot. Accordingly, they can be used to further reduce the energy consumption of the reactor. Exhaust gases exiting from first heat exchanger 132 are directed to a further second heat exchanger 134. Second heat exchanger 134 is used to preheat feed silica (usually sand) prior to introduction into reaction vessel 100. Second heat exchanger 134 can be any conventional heat exchanger for transferring heat from a gas to a solid, including a fluidized bed or other appropriate heat exchanger. In this way, the silica can be made very hot prior to introduction into reaction vessel 100. Heat exchanger 134 should heat feed silica to a minimum temperature of 250° F., and preferably to a temperature in excess of 1200° F. The maximum temperature to which feed silica should be heated is 2500° F., since above this, silica can fuse. Second heat exchanger 134 can also be used to heat a sand and soda ash mixture. In this case, the maximum preheat temperature is about 1400° F. since, above this temperature, the mixture can become sticky and difficult to handle.

As may be seen from FIG. 2, silica exiting second heat exchanger 134 continues down conduit 136 into feeder 118. The feed silica is heated, but the feed soda ash is not. While the feed soda ash could be heated separately, or even pre-mixed with the silica, the mixture tends to become sticky and difficult to handle at high temperatures. Thus a premixed batch cannot be heated to as high a temperature as can be the separate reactants. Accordingly, the silica alone can be preheated to a higher temperature than the batch, thus making the more efficient use of the waste heat from reaction vessel 100.

The reaction vessel 100 is preferably a water cooled metal box with a thin layer of refractory material. This enables the unit to be heated up in about three hours, which allows for shutting down the unit on weekends. Prior art units would take up to 5 to 6 days to heat up and require that they be operated continuously (24 hours a day, seven days a week). The water cooled box with a thin layer of refractory minimizes refractory costs and freezes any silicate which seeps through the refractory. The frozen silicate then acts as a refractory.

After hot gases exit second heat exchanger 134, there is still heat in the gases which may be recoverable. Specifically, the exhaust gases can be used to heat water. The resulting hot water is used to dissolve the silicate product from the reactor to make a liquid silicate material. In many applications, the solid sodium silicate is dissolved prior to use. Sodium silicate dissolves much more easily in hot water than cold water, and therefore in these application it would be useful to have a source of hot water available. While this does not increase the efficiency of the reactor per se, it does serve to increase the efficiency of the overall operation of making liquid silicate product.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for producing sodium silicate from a reactor having a reaction vessel including an inlet, an outlet, and an exhaust, said reactor also having at least one submerged burner in contact with and supplying heat to a bed of sand, soda ash and molten sodium silicate in said reaction vessel, and a trough extending from and communicating with said reaction vessel outlet, said trough having an outlet below the level of said reaction vessel outlet, said method comprising:

introducing to said reaction vessel, feed sand and soda ash at a total rate in excess of 100 pounds per hour per square foot of reaction vessel surface;

introducing heat, from said burner directly into said bed sufficient to cause said sand and soda ash to react, in said reaction vessel;

withdrawing said molten sodium silicate from said reaction vessel through said trough wherein said trough has a downward angle in excess of 30°; and collecting said silicate having a density in excess of 125 lb/ft$^3$.

2. The method of claim 1 wherein said heat is introduced at a rate of not more than 1800 BTU per pound of silicate produced.

3. The method of claim 1 wherein said burner is a top-submerged lance.

4. A method for producing potassium silicate from a reactor having a reaction vessel including an inlet, an outlet, and an exhaust, said reactor also having at least one submerged burner in contact with and supplying heat to a bed of sand, potassium carbonate, and molten potassium silicate in said reaction vessel, and a trough extending from and communicating with said reaction vessel outlet, said trough having an outlet below the level of said reaction vessel outlet, said method comprising:

introducing to said reaction vessel, feed sand and potassium carbonate at a total rate in excess of 100 pounds per hour per square foot of reaction vessel surface;

introducing heat, from said burner directly into said bed sufficient to cause said sand and potassium carbonate to react, in said reaction vessel;

withdrawing said molten potassium silicate from said reaction vessel through said trough wherein said trough has a downward angle in excess of 30°; and collecting said silicate having a density in excess of 125 lb/ft$^3$.

5. The method of claim 4 wherein said step of introducing to said reaction vessel, feed sand and potassium carbonate, also includes:

introducing to said reaction vessel, soda ash.

6. A reactor for producing sodium silicate comprising:

a reaction vessel including an inlet, an outlet, and an exhaust;

means for introducing feed sand and soda ash to said reaction vessel;

at least one submerged burner in contact with and supplying heat to a bed of sand, soda ash, and molten sodium silicate in said reaction vessel, said heat sufficient to cause said sand and soda ash to react; and means for withdrawing said molten sodium silicate from said reaction vessel in a stream through a trough extending from and communicating with said reaction vessel outlet, having an outlet below the level of said reaction vessel outlet, and having a downward angle in excess of 30°.

7. A reactor for producing potassium silicate comprising:

a reaction vessel including an inlet, an outlet, and an exhaust;

means for introducing feed sand and potassium carbonate to said reaction vessel;

at least one submerged burner in contact with and supplying heat to a bed of sand, potassium carbonate, and molten potassium silicate in said reaction vessel and sufficient to cause said sand and potassium carbonate to react; and means for withdrawing said molten potassium silicate from said reaction vessel in a stream through a trough extending from and communicating with said reaction vessel outlet, having an outlet below the level of said reaction vessel outlet, and having a downward angle in excess of 30°.

* * * * *